Patented July 30, 1940

2,209,699

UNITED STATES PATENT OFFICE 2,209,699

PROCESS FOR CONVERTING ALCOHOL TO ETHER

Armand Mastrangelo, Geneva, Switzerland, assignor to the firm Crima S. A., Geneva, Switzerland, a corporation of Switzerland No Drawing. Application June 15, 1937, Serial No. 148,308. In Switzerland July 4, 1936

9 Claims. (Cl. 260—614)

The present invention relates to an improved one stage process for converting ethylalcohol into a combustible volatile liquid containing ether by catalytic reaction at atmospheric pressure. According to this process, alcohol vapours containing up to 10% or 15% water at a temperature lying between 150° C. and 300° C., preferably at 200° C., in the absence of oxidising gas, are passed over one single catalyst capable of transforming in one single operation first the alcohol partially into ethylene and water and afterwards this mixture formed of non-transformed alcohol, ethylene and water, into ether and water. The product thus obtained is purified in order to obtain finally a liquid formed of a mixture composed of water, alcohol and ether completely void of acid and sulphurized products.

It is on the one hand known that oxides such as aluminium oxide and glucinium oxide for example are capable of catalysing the transformation of ethyl alcohol into ethylene or into ether (Sabatier, 1st publication on the catalysts in organic chemistry, page 175: Chimie et Industrie, vol. II, 1924, page 449 Goris) and, on the other hand, that ethylene reacting either with sulphuric acid or with bisulphate of potassium yields intermediate products such as for example mono-ethyl sulphate of potassium the properties of which are described in literature, among which it is to be noted that between 200° and 300° the decomposition is found partially to yield ether in very small quantities. It has been found that these intermediate products can react like catalysers on the ethylene and the alcohol and produce ether. The process according to the present invention is precisely based upon this property.

In the British specification No. 445,963 it was proposed to effect the catalytic treatment in two successive phases, in the first phase the alcohol being passed over a catalyst formed by at least one metallic oxide and, in the second phase, the products resulting from the first being passed over a catalyst formed by at least one metallic sulphate or bisulphate or chloride. The alcohol vapours were kept at a temperature approximating to 300° C. in the first phase and between 50° and 400° C. in the second phase.

According to the present invention, instead of two phases, there is only one single operation which takes place in a sole furnace and realises simultaneously the two phases indicated in the aforesaid British specification.

The catalyst used according to the present invention is composed: (1) by a double salt or a mixture of salts such as for instance sulphates of aluminium and sulphate or bisulphate of an alkali metal capable of yielding by its decomposition under the influence of heat and at atmospheric pressure with the alcohol and the ethylene intermediate compounds such as mono-ethyl sulphate of potassium, ethyl-sulphate of silver for example which reacting as catalyser on the ethylene and the alcohol yield ether; (2) by a carrier having also a catalysing action and containing oxides of metals such as aluminium, glucinium, iron, chromium, etc., which oxides favour the reaction by forming ethylene; (3) by an activating agent such as for example sulphate of silver, ethylsulphate of silver, etc., in extremely low proportions for example 0.5 part per thousand.

The double salt may be an alum, $KAl(SO_4)_2$, $NaAl(SO_4)_2$, $NH_4Al(SO_4)_2$; a double chloride such as $MgCl_2KCl$, etc., preferably a salt capable of being easily regenerated after being exhausted as catalyst.

The double salt may be replaced by a mixture of its constituents, for instance aluminium sulphate and sulphate or bisulphate of potassium or sodium.

In the following some examples of the composition of the catalyser are given, but it is understood that the proportions given do not limit the invention to these proportions:

|  | Parts by weight |
|---|---|
| (1) Aluminium sulphate | 50 |
| Potassium sulphate | 49 |
| Aluminium oxide ($Al_2O_3$) | 1 | are mixed together. The whole mass is added with 0.5 part per thousand ethylsulphate of silver with regard to its weight.

|  | Parts by weight |
|---|---|
| (2) Aluminium sulphate | 59.5 |
| Potassium sulphate | 30.5 |
| Aluminium oxide ($Al_2O_3$) | 10 | are mixed together. To the mixture obtained 0.5 part per thousand of its weight ethylsulphate of silver is added.

|  | Parts by weight |
|---|---|
| (3) Aluminium sulphate | 75.5 |
| Potassium sulphate | 23.5 |
| Aluminium oxide ($Al_2O_3$) | 1 | are mixed together and 0.5 part per thousand ethylsulphate of silver is added to the whole mass.

|  | Parts by weight |
|---|---|
| (4) Aluminium sulphate | 55.5 |
| Potassium sulphate | 43.5 |
| Aluminium oxide ($Al_2O_3$) | 1 | are mixed together and the mixture obtained is added with 0.5 part per thousand of its weight of ethylsulphate of silver.

| | Parts by weight |
|---|---|
| (5) Aluminium sulphate | 60 |
| Potassium bisulphate | 39 |
| Aluminium oxide ($Al_2O_3$) | 1 | are mixed together and the mixture obtained is added with 0.5 part per thousand of its weight of ethylsulphate of silver.

| | Parts by weight |
|---|---|
| (6) Aluminium sulphate | 1 |
| Potassium sulphate | 39 |
| Aluminium oxide ($Al_2O_3$) | 60 | are mixed together. The mixture obtained is added with 0.5 part per thousand of its weight of ethylsulphate of silver.

In all these formulae the aluminium oxide ($Al_2O_3$) may be replaced by iron oxide ($Fe_2O_3$) or chromium oxide ($Cr_2O_3$) and the potassium sulphate by sodium sulphate.

The invention as pertaining to new industrial products also relates to combustible volatile liquids containing ether and obtained by the aforesaid specified process.

Finally the invention relates to the use of these liquids as fuel in internal combustion engines. etc.

The way to carry out the process according to the invention is for example as follows:

Before passing the alcohol vapours into the apparatuses care must be taken to replace the air therein by an inert gas such as for example nitrogen, carbonic acid gas, etc. Said apparatuses are heated to the required temperature which must not be below 150° C. It is indispensable that the alcohol vapours should, when they react with the catalyst, be in an atmosphere completely void of oxygen, the latter being susceptible of yielding intermediate products capable of causing explosions. In order to have a homogeneous temperature in the reaction of catalysis the alcohol vapours are made to circulate in a preheater so as to enter the catalysis furnace at a temperature at least equal to 150° C.

*Example*

Ethyl alcohol at 90% containing 10% water is brought to boiling temperature and distilled. The vapours are directed at ordinary pressure through a preheater furnace brought to a temperature approximating to 200° C. Then they are directed at a speed of about 200 litres per hour through a catalysis tube heated at a temperature approximating to 200° C. and filled with about 360 kg. of a catalyst composed as hereinbefore mentioned.

A current of carbonic acid gas has previously evacuated the air from those parts of the apparatus in which the reaction is to take place so that the atmosphere therein shall be inert, thus permitting of avoiding any danger of explosion. About 50% of the alcohol used are converted into ether, and about 0.3% into ethylene. The vapours thus obtained and composed of alcohol which has not been transformed, ether, water and a small amount of ethylene, are then directed through a tower filled with scrap-copper, which rid said vapours of impurities, especially of sulphured impurities, they then circulate in a dephlegmator which separates from the mixture the products which are too heavy, and then finally in a refrigerator in which they are condensed in order to yield a liquid having a specific weight varying from 0.718 to 0.780 which is the final product. This liquid is composed of water, alcohol and ether rid of acid and sulphured products. Its boiling point varies between 40° and 80° C. according to the duration of the treatment that is to say according to whether the etherification of the alcohol is more or less complete.

The hereinbefore described process compared to the processes already known has the advantage of necessitating the use of only one catalyst which transforms the alcohol in a single operation, thus realizing simultaneously the two phases indicated in the British specification No. 445,943. The inert material employed as a carrier for the catalyst properly so called is cheap. The temperature at which the process is effected is only 200° C. and less instead of 300° C. and more. It depends from the percentage of the alcohol used. The more the alcohol is pure the lower will be the temperature employed for the reaction. The final product obtained is free of impurities. The process is economical and gives a good yield.

What I claim is:

1. A one stage process for converting alcohol to ether, comprising passing alcohol vapors containing up to 15% of water at a temperature lying between 150° and 300° centigrade in the absence of oxidising gas over a catalyst composed of a mixture of sulphates of aluminium and alkali metals, mutually present together with a carrier having a catalysing action and consisting of a metallic oxide and with an activating substance consisting of a sulphate of silver, in order to obtain a gaseous product, collecting the gaseous product obtained and condensing the same to form a liquid mixture composed of non-converted alcohol, water and ether, said liquid mixture being adapted for use as a motor fuel.

2. A one stage process for converting alcohol to ether, comprising passing alcohol vapors over a catalyst composed of a mixture of an alkali metal alum, aluminium oxide and an activating substance including ethyl sulphate of silver all mutually present, and collecting and condensing the resulting product.

3. A one stage process for converting alcohol to ether, comprising passing alcohol vapors over a catalyst composed of a mixture of a predetermined amount of potassium alum and alumina mutually present together with a relatively very small amount of ethylsulphate of silver.

4. A one stage process for converting alcohol to ether, comprising passing alcohol vapors at a temperature of about 200° C. over a catalyst composed of a mixture of aluminium sulphate, potassium sulphate and aluminium oxide, to which mixture is added 0.5 part in 1000 parts by weight of ethyl sulphate of silver of said mixture.

5. A one stage process for converting alcohol to ether, comprising passing alcohol vapors containing up to 15% of water at a temperature lying between 150° and 300° centigrade in the absence of oxidising gas over a catalyst composed of a mixture of sulphates of aluminium and alkali metals and 0.5 part by weight of ethyl sulphate of silver in 1000 parts of mixture, together with a carrier having a catalysing action and consisting of a metallic oxide, in order to obtain a gaseous product, collecting the gaseous product obtained and condensing the same to form a liquid mixture composed of non-converted alcohol, water and ether, said liquid mixture being adapted for use as a motor fuel.

6. A one stage process according to claim 5, in which the catalyst is formed by a mixture of about 50 parts by weight of aluminium sulphate, about 49 parts by weight of potassium sulphate, 0.5 part by weight of ethyl sulphate of silver in 1000 parts of the mixture, and about 1 part by weight of aluminum oxide.

7. A one stage process according to claim 1, in which the catalyst is formed by a mixture of 50 parts by weight of aluminium sulphate, 49 parts by weight of potassium sulphate, 1 part by weight of aluminum oxide, and 0.5 part by weight of ethyl sulphate of silver in 1000 parts of the total mixture.

8. A one stage process according to claim 1, in which the catalyst is formed by a mixture of 59.5 parts by weight of aluminium sulphate, 30.5 parts by weight of potassium sulphate, 10 parts by weight of aluminum oxide, and 0.5 part by weight of ethyl sulphate of silver in 1000 parts of the total mixture.

9. A one stage process according to claim 1, in which the catalyst is formed by a mixture of 75.5 parts by weight of aluminium sulphate, 23.5 parts by weight of potassium sulphate, 1 part by weight of aluminum oxide, and 0.5 part by weight of ethyl sulphate of silver in 1000 parts of the total mixture.

ARMAND MASTRANGELO.